(12) United States Patent
Ryon et al.

(10) Patent No.: US 12,241,419 B2
(45) Date of Patent: Mar. 4, 2025

(54) FUEL INJECTORS ASSEMBLIES WITH TANGENTIAL FLOW COMPONENT

(71) Applicant: Collins Engine Nozzles, Inc., Des Moines, IA (US)

(72) Inventors: Jason A. Ryon, Carlisle, IA (US); Lev A. Prociw, Chatham (CA); Brandon P. Williams, Johnston, IA (US)

(73) Assignee: Collins Engine Nozzles, Inc., Des Moines, IA (US)

( * ) Notice: Subject to any disclaimer, the term of this patent is extended or adjusted under 35 U.S.C. 154(b) by 0 days.

(21) Appl. No.: 17/895,941

(22) Filed: Aug. 25, 2022

(65) Prior Publication Data

US 2024/0068402 A1    Feb. 29, 2024

(51) Int. Cl.
*F23R 3/28* (2006.01)
*F02C 7/232* (2006.01)

(52) U.S. Cl.
CPC ............... *F02C 7/232* (2013.01); *F23R 3/28* (2013.01); *F05D 2220/32* (2013.01); *F05D 2240/36* (2013.01)

(58) Field of Classification Search
CPC ...... F23R 3/12; F23R 3/26; F23R 3/28; F23R 3/283; F23R 3/34; F23R 3/52
See application file for complete search history.

(56) References Cited

U.S. PATENT DOCUMENTS

| | | | |
|---|---|---|---|
| RE34,962 E | | 6/1995 | Shekleton et al. |
| 5,839,283 A | * | 11/1998 | Dobbeling ............... F23R 3/286 60/737 |
| 6,625,971 B2 | | 9/2003 | Graves |
| 9,644,844 B2 | | 5/2017 | Prociw |
| 9,810,186 B2 | * | 11/2017 | Mansour ............... F23D 11/103 |
| 10,739,003 B2 | * | 8/2020 | Proscia ................... F23R 3/286 |
| 10,816,211 B2 | | 10/2020 | Dudebout et al. |
| 10,989,410 B2 | * | 4/2021 | Chen ......................... F23R 3/06 |
| 2011/0185703 A1 | * | 8/2011 | Dodo ........................ F23R 3/34 60/39.461 |

* cited by examiner

*Primary Examiner* — Alain Chau
*Assistant Examiner* — Sean V Meiller
(74) *Attorney, Agent, or Firm* — Kinney & Lange, P.A.

(57) ABSTRACT

A fuel injector assembly can include a housing structure defining a circular shape, and one or more fuel injectors disposed in and/or formed integrally with the housing structure. The housing structure can be configured to angle the one or more fuel injectors in a direction such that the one or more fuel injectors effuse flow in a vector having a tangential flow component.

9 Claims, 8 Drawing Sheets

Fig. 3 ional flow component.

FUEL INJECTORS ASSEMBLIES WITH TANGENTIAL FLOW COMPONENT

FIELD

This disclosure relates to fuel injectors, e.g., for turbomachines.

BACKGROUND

Traditionally, fuel injectors are oriented to spray fuel axially or radially into a combustor in a gas turbine engine. When the flowfield produced by the fuel injector within the combustor is narrow, there can be certain issues. For example, light-around can occur such that a flame which is supposed to be propagated around the combustor from ignition to adjacent injectors is impeded. Circumferential temperature maldistribution can also occur such that there can be hot spots from individual injectors, with cold spots between the injectors which effects turbine durability.

Such conventional methods and systems have generally been considered satisfactory for their intended purpose. However, there is still a need in the art for improved fuel injectors. The present disclosure provides a solution for this need.

SUMMARY

In accordance with at least one aspect of this disclosure, a fuel injector assembly can include a housing structure defining a circular shape, and one or more fuel injectors disposed in and/or formed integrally with the housing structure. The housing structure can be configured to angle the one or more fuel injectors in a direction such that the one or more fuel injectors effuse flow in a vector having a tangential flow component.

The one or more fuel injectors can include a plurality of circumferentially arranged fuel injectors. The housing structure can be shaped such that each fuel injector includes a tangential flow component and an axial flow component. In certain embodiments, the housing structure can be shaped such that each fuel injector effuses flow in a different direction relative to the other fuel injectors, but in a same direction relative to the housing structure.

In certain embodiments, the housing structure can include two or more (e.g., three) concentric rings of the fuel injectors. In certain embodiments, the housing structure can be shaped such that each ring of fuel injectors effuses flow in the same swirl direction.

In certain embodiments, the housing structure can be shaped such that an outer ring of fuel injectors is configured to effuse flow in a first swirl direction and such that an inner ring of fuel injectors is configured to effuse flow in a second swirl direction. In certain embodiments, the housing structure can be shaped such that one of the two or more concentric rings (e.g., a middle ring) of fuel injectors does not include a tangential component, and effuses flow in an axial direction without a swirl direction.

In accordance with at least on aspect of this disclosure, a combustor assembly for a turbomachine can include a fuel injector assembly. The fuel injector assembly can be any fuel injector assembly disclosed herein, e.g., as described above.

In accordance with at least one aspect of this disclosure, a method can include effusing flow into a turbomachine combustor having a tangential flow component. Effusing flow can include creating a first swirl direction in a first ring, and creating a second swirl direction opposite with first swirl direction in a second ring that is concentric with the first ring. Effusing flow can include effusing axial flow in a third concentric ring between the first concentric ring and the second concentric ring. The method can include any other suitable method(s) and/or portion(s) thereof.

These and other features of the embodiments of the subject disclosure will become more readily apparent to those skilled in the art from the following detailed description taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures, wherein.

DETAILED DESCRIPTION

Figure 1A:
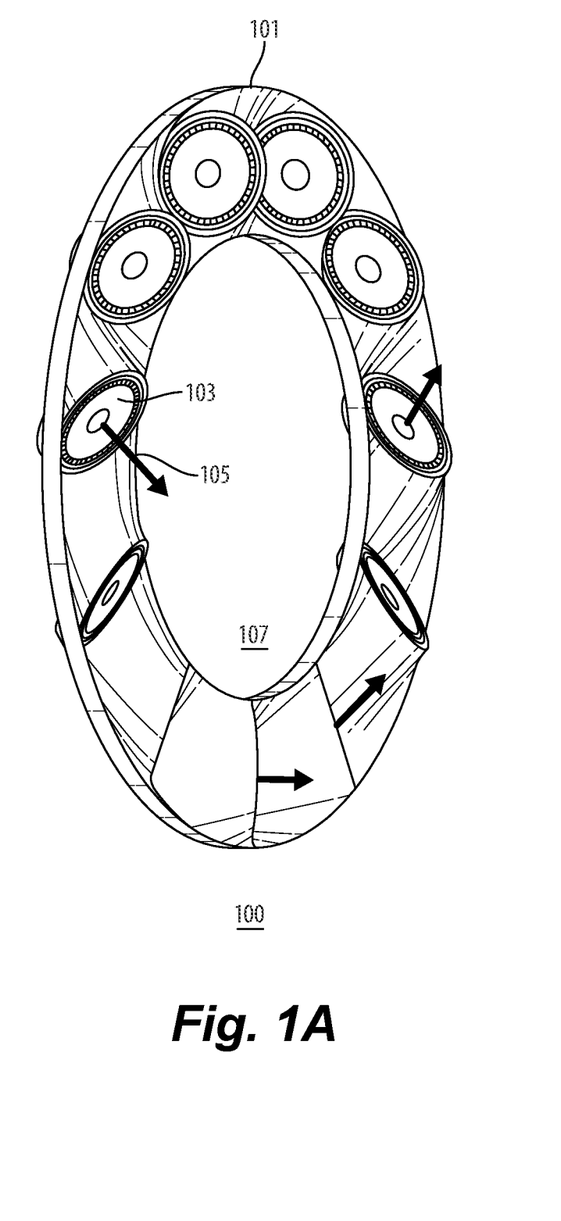
FIG. 1A is a perspective view of an embodiment of a fuel injector assembly in accordance with this disclosure, showing an injection vector having a tangential component.

Reference will now be made to the drawings wherein like reference numerals identify similar structural features or aspects of the subject disclosure. For purposes of explanation and illustration, and not limitation, an illustrative view of an embodiment of a fuel injector assembly in accordance with the disclosure is shown in FIGS. 1A and 1s designated generally by reference character 100. Other embodiments and/or aspects of this disclosure are shown in FIGS. 1B-3.

Figure 1B:
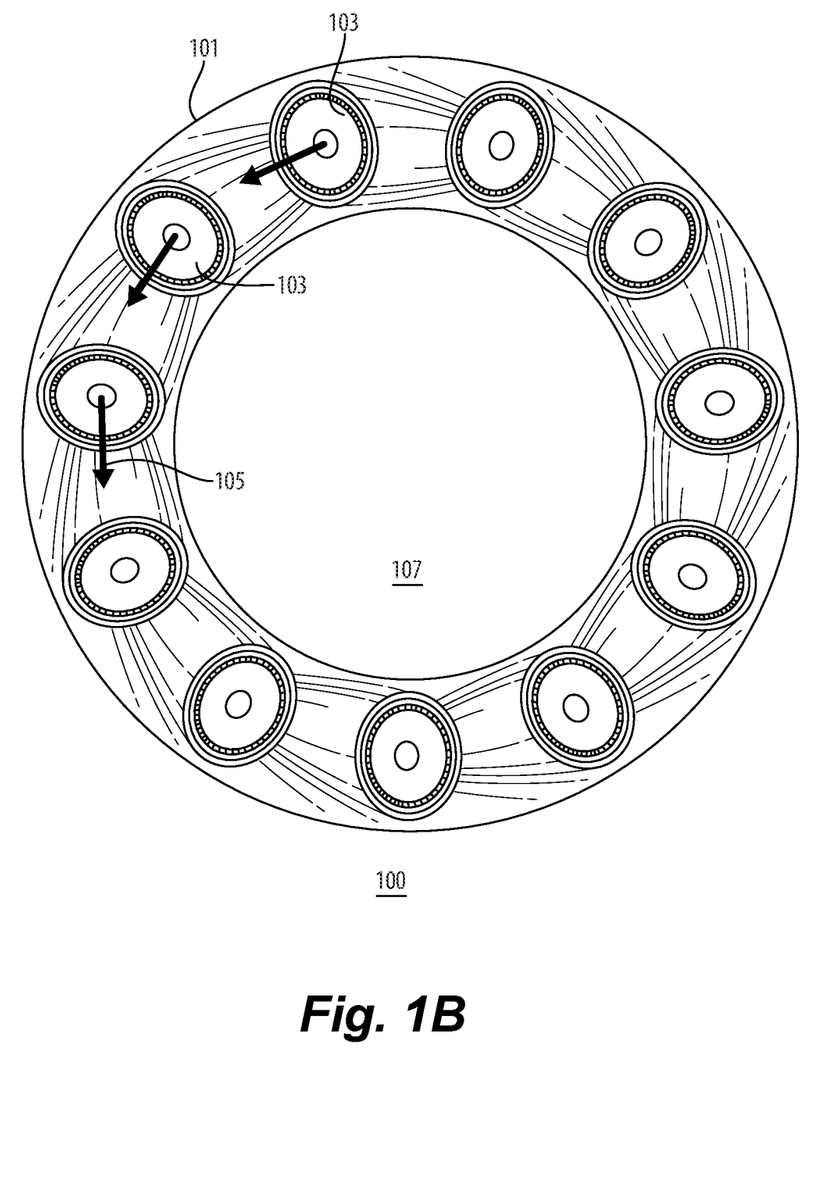
FIG. 1B is an elevation view of the embodiment FIG. 1A, showing the tangential component.

In accordance with at least one aspect of this disclosure, referring to FIGS. 1A, 1B, 1C, and 1D, a fuel injector assembly 100 can include a housing structure 101 defining a circular shape (e.g., a ring as shown). The assembly 100 can include one or more fuel injectors 103 disposed in and/or formed integrally with the housing structure 101. The housing structure 101 can be configured to angle the one or more fuel injectors 103 in a direction such that the one or more fuel injectors 103 effuse flow in a vector 105 having a tangential flow component (e.g., as shown in the view of FIG. 1B).

As shown, the one or more fuel injectors 103 can include a plurality of circumferentially arranged fuel injectors 103 (e.g., arranged on in ring having a central opening 107). The housing structure 101 can be shaped such that each fuel injector 103 includes a tangential flow component and an axial flow component (e.g., as shown in FIG. 1D). In certain embodiments, the housing structure 101 can be shaped such that each fuel injector effuses flow in a different direction relative to the other fuel injectors 103, but in a same direction relative to the housing structure 101. In this regard, the vectors 105 can turn about a central axis of the housing structure 101 to maintain a same relative angle to the housing structure (e.g., the same amount of axial and tangential component). Certain embodiments can include differing axial and/or tangential components of the vector 105 relative to one or more other fuel injectors 103.

Referring to FIGS. 2A, 2B, 2C, and 3, in certain embodiments, an assembly 200, 300 can include a housing structure 201, 301 that can have two or more (e.g., three as shown) concentric rings 201a, 301a, 201b, 301b, 201c, 301c of the fuel injectors 103. Each ring 201a, 301a, 201b, 301b, 201c, 301c can include the same number of fuel injectors 103 in certain embodiments. In certain embodiments, each ring can include a different number of fuel injectors 103. Any suitable relative number of fuel injectors 103 is contemplated herein.

Figure 2A:
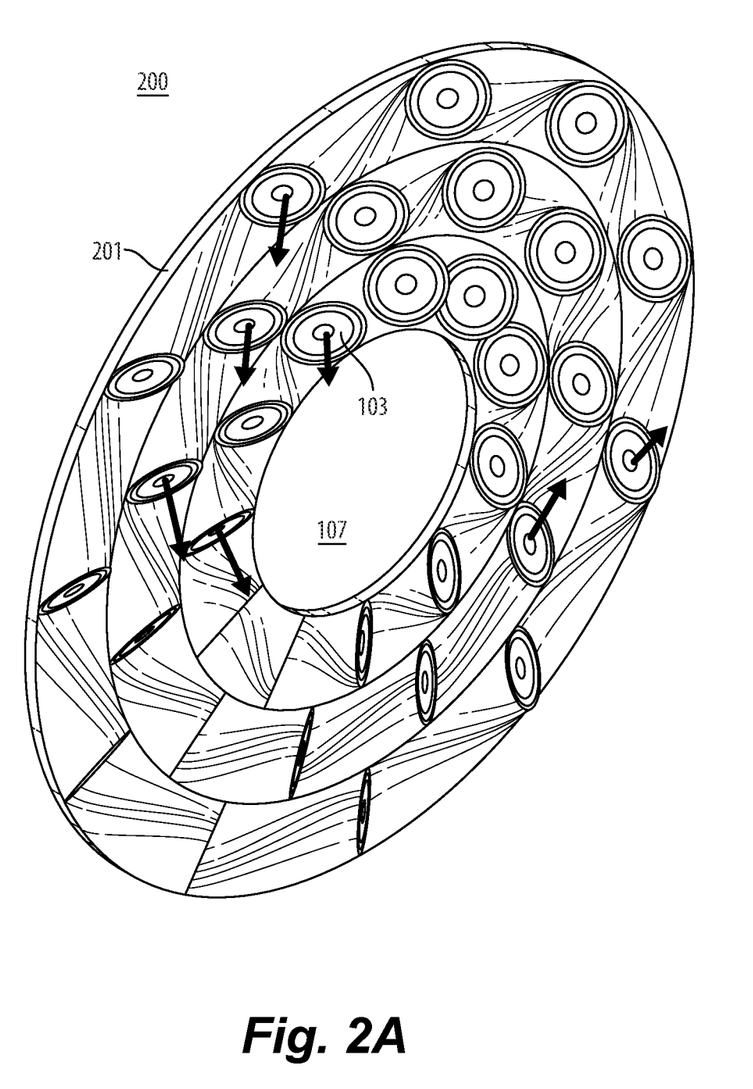
FIG. 2A is a perspective view of an embodiment of a fuel injector assembly in accordance with this disclosure, showing an injection vector having a tangential component.
Figure 2B:
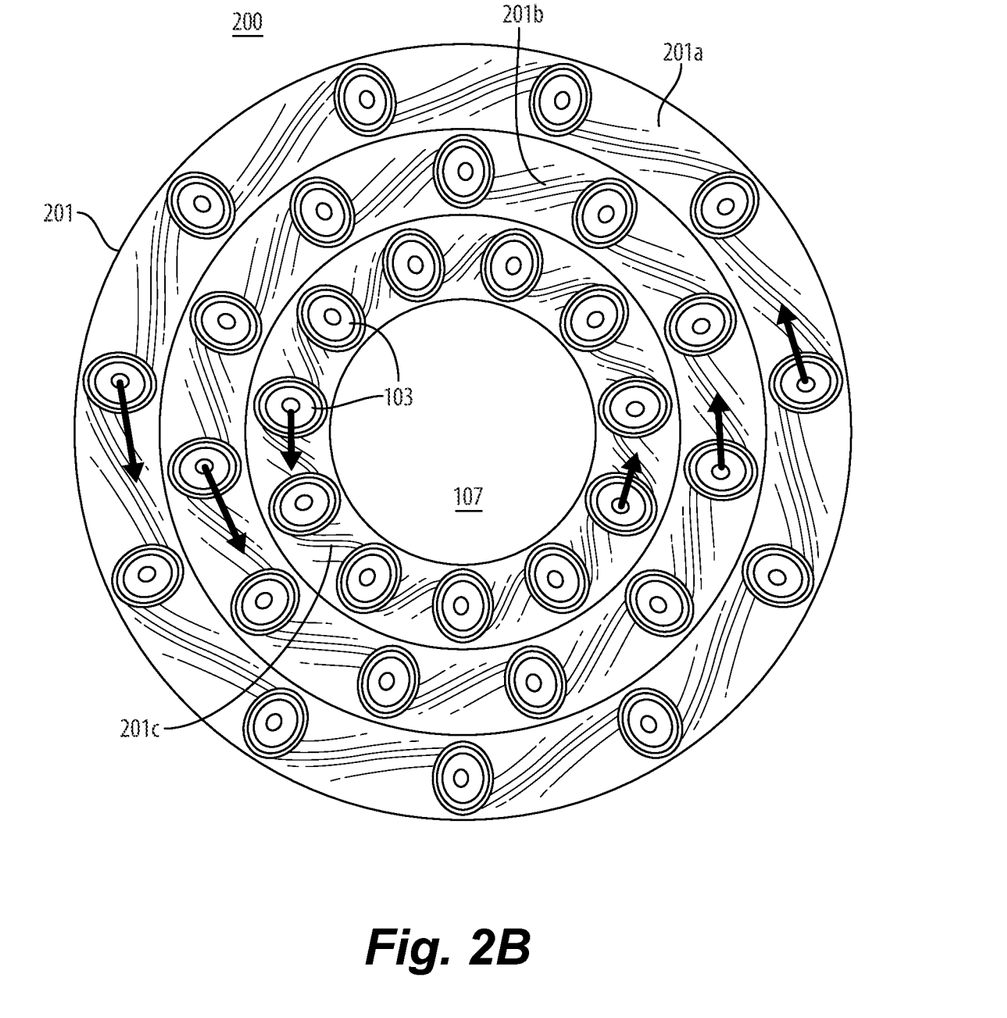
FIG. 2B is an elevation view of the embodiment FIG. 2A, showing the tangential component.
Figure 2C:
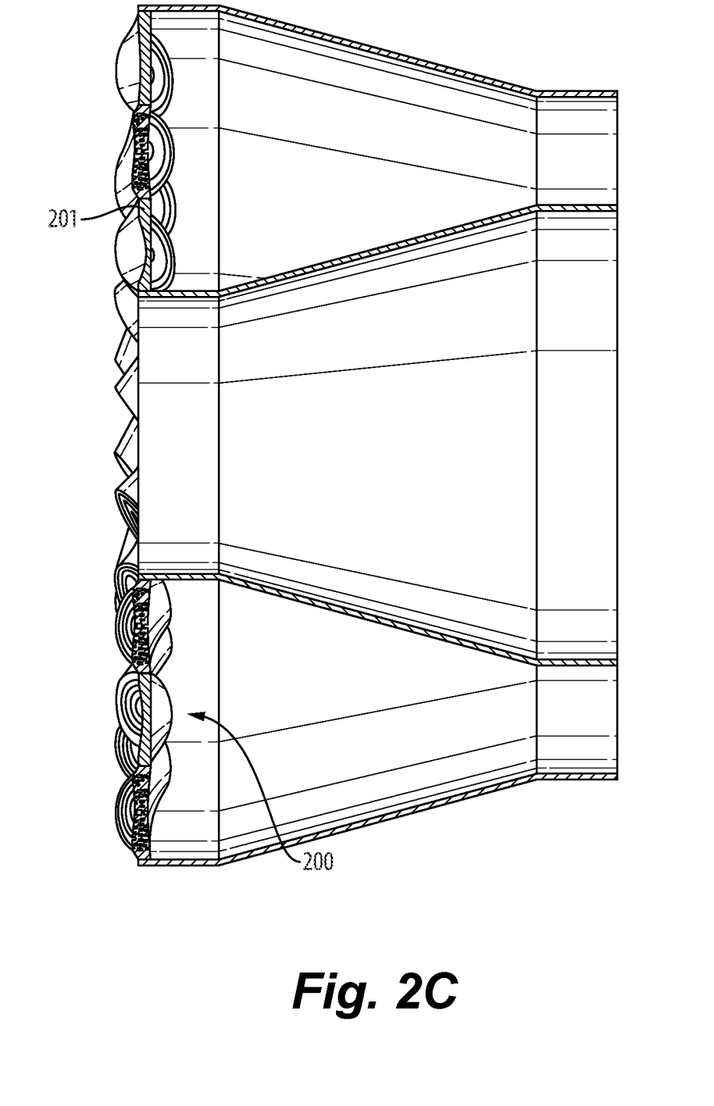
FIG. 2C is a cross-sectional view of the embodiment of FIG. 2A, shown mounted in a combustor.

One or more of the rings of the fuel injectors 103 can be clocked out of alignment with another ring, e.g., as shown in FIG. 2C. For example, the inner ring 201c and outer ring 201a can be aligned, whereas the middle ring 201b can be misaligned with both. Any other suitable clocking arrangement (e.g., all in alignment, all out of alignment) is contemplated herein.

Figure 3:
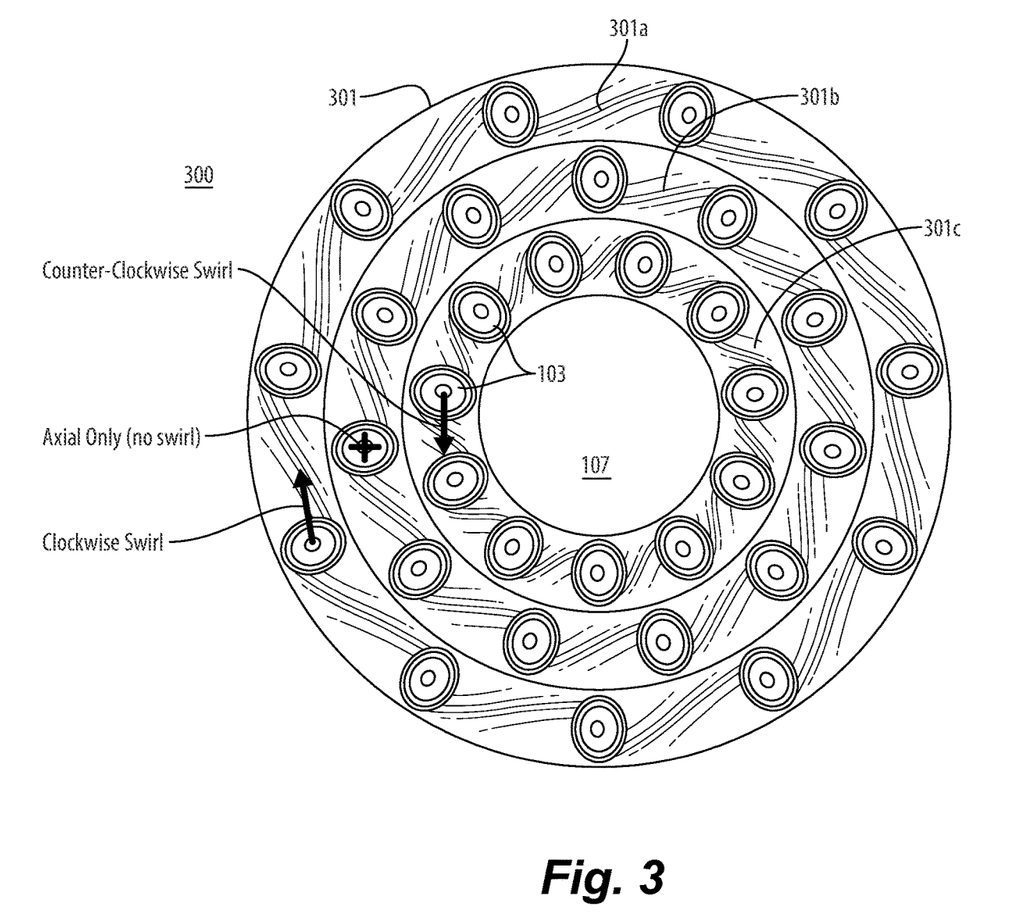
FIG. 3 is a perspective view of an embodiment of a fuel injector assembly in accordance with this disclosure, showing an injection vector having a tangential component.

As shown in FIGS. 2A-2C, in certain embodiments, the housing structure 201 can be shaped such that each ring 201a, 201b, 201c of fuel injectors 103 effuses flow in the same swirl direction. As shown in FIG. 3, in certain embodiments, the housing structure 301 can be shaped such that an outer ring 301a of fuel injectors 103 is configured to effuse flow in a first swirl direction (e.g., counter clockwise) and such that an inner ring 301c of fuel injectors 103 is configured to effuse flow in a second swirl direction (e.g., clockwise). In certain embodiments, the housing structure 301 can be shaped such that one of the two or more concentric rings (e.g., a middle ring 301b) of fuel injectors 103 does not include a tangential component, and effuses flow in an axial direction without a swirl direction. Embodiments can include any suitable arrangements and relative directions of tangentially oriented fuel injectors and/or housing therefor.

Each ring 201a, 301a, 201b, 301b, 201c, 301c of the housing structure 201, 301 can be integrally formed and/or connected to adjacent rings. In certain embodiment, each ring 201a, 301a, 201b, 301b, 201c, 301c can be a separate component installed individually. Any suitable ring arrangement is contemplated herein.

Figure 1C:
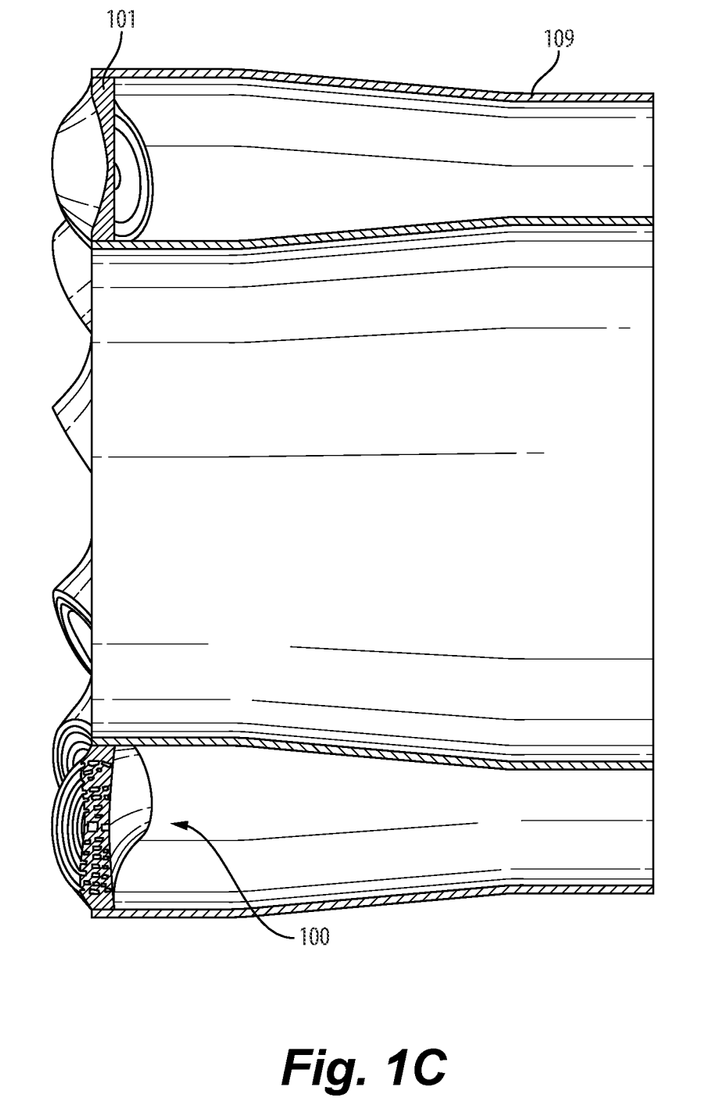
FIG. 1C is a cross-sectional view of the embodiment of FIG. 1A, shown mounted in a combustor.
Figure 1D:
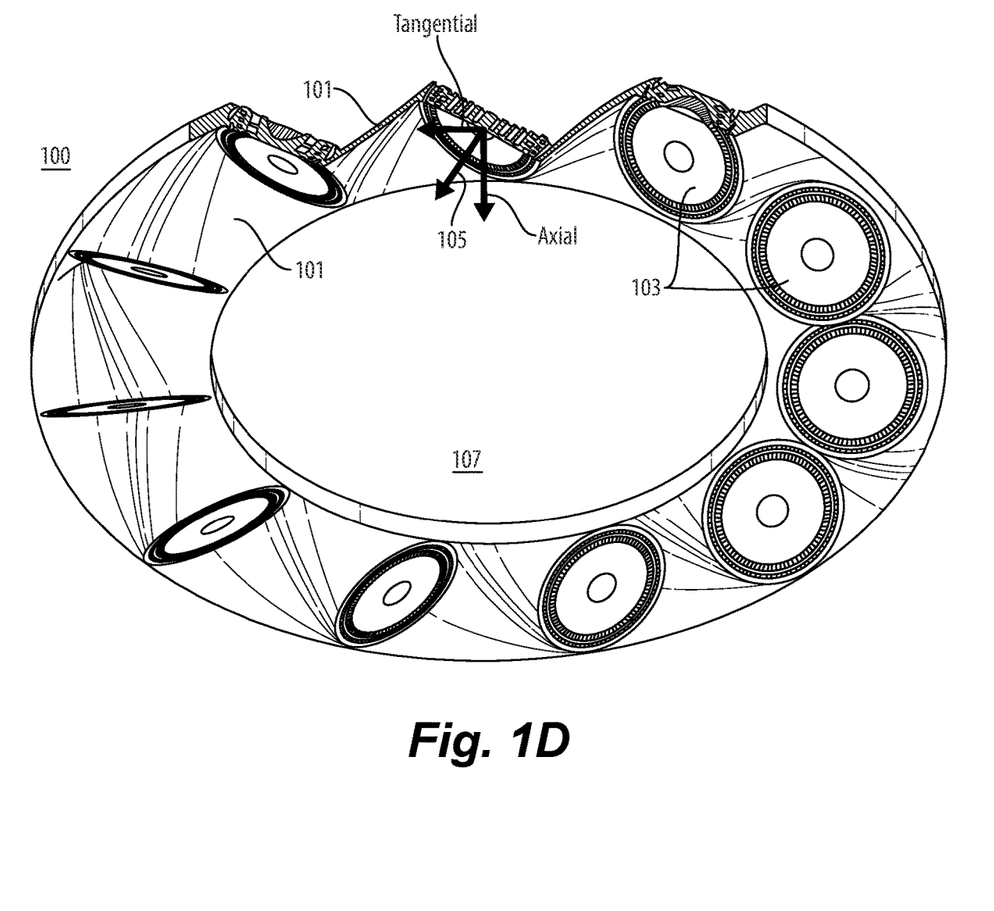
FIG. 1D is a cross-sectional view of the embodiment of FIG. 1A, showing the flow components of the injection vector.

In accordance with at least on aspect of this disclosure, a combustor assembly for a turbomachine (e.g., as shown in FIG. 1C) can include a fuel injector assembly (e.g., attached to a combustor 109). The fuel injector assembly can be any fuel injector assembly disclosed herein, e.g., assembly 100, 200, 300 as described above.

In accordance with at least one aspect of this disclosure, a method can include effusing flow into a turbomachine combustor having a tangential flow component. Effusing flow can include creating a first swirl direction in a first ring, and creating a second swirl direction opposite with first swirl direction in a second ring that is concentric with the first ring. Effusing flow can include effusing axial flow in a third concentric ring between the first concentric ring and the second concentric ring. The method can include any other suitable method(s) and/or portion(s) thereof.

Traditionally, injectors were loaded into an assembly axially (e.g., aligned with a central axis of a combustor). Embodiments, however, can be additively manufactured in position. Certain embodiments can be molded or milled and have inserted injectors, however, certain embodiments can have the entire assembly (e.g., a dome plate) as one piece.

In accordance with certain embodiments, a benefit of tilting fuel injectors partially tangentially toward each other is that they can keep each other lit. In certain embodiments, tilt of the fuel injectors may also include a radial component and/or an axial component (tangential, radial, and axial relative to a substantially circular shaped housing structure and/or combustor and/or turbomachine). In accordance with embodiments, one or more igniters can now be positioned between fuel injectors 103, or in other suitable locations because the flow provided in embodiments can be aimed at the desired spot relative to the injector and/or housing to allow the igniter to have a desired flow at the igniter (e.g., less intense than direct flow on the igniter).

Embodiments can be applied to multi-radial row/ring injectors. Each row/ring can have same or different tilts (magnitude and/or direction). Each row/ring can also be adjusted to have different fuel air ratios, and/or bias flow outwardly with more aggressive tilt, for example. In certain embodiments, the injectors can be tilted in opposite directions to cancel out the overall combustor swirl. Additionally, some rows can be no-swirl, such as in a center row for example.

Embodiments include fuel injectors oriented with a tangential component. Embodiments can include an injector dome shaped to allow tilted injectors. Embodiments can include multiple staggered radial rows/rings.

In accordance with embodiments, injectors which feed into the combustor of a gas turbine engine can be tilted so they have a tangential component to their orientations. This orientation can allow one injector to ignite the neighboring injector, and so on. Additionally, this orientation can reduce cold spots between injectors, resulting in a more uniform temperature distribution to the turbine. The housing structure (e.g., dome plate) can be convoluted so that it conforms to the shape of the tilted injectors. Embodiments can provide better light-around, and reduced temperature non-uniformity compared to traditional systems.

Those having ordinary skill in the art understand that any numerical values disclosed herein can be exact values or can be values within a range. Further, any terms of approximation (e.g., "about", "approximately", "around") used in this disclosure can mean the stated value within a range. For example, in certain embodiments, the range can be within (plus or minus) 20%, or within 10%, or within 5%, or within 2%, or within any other suitable percentage or number as appreciated by those having ordinary skill in the art (e.g., for known tolerance limits or error ranges).

The articles "a", "an", and "the" as used herein and in the appended claims are used herein to refer to one or to more than one (i.e., to at least one) of the grammatical object of the article unless the context clearly indicates otherwise. By way of example, "an element" means one element or more than one element.

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising"

can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of," "only one of," or "exactly one of."

Any suitable combination(s) of any disclosed embodiments and/or any suitable portion(s) thereof are contemplated herein as appreciated by those having ordinary skill in the art in view of this disclosure.

The embodiments of the present disclosure, as described above and shown in the drawings, provide for improvement in the art to which they pertain. While the subject disclosure includes reference to certain embodiments, those skilled in the art will readily appreciate that changes and/or modifications may be made thereto without departing from the spirit and scope of the subject disclosure.

What is claimed is:

1. A fuel injector assembly, comprising:
a housing structure defining a circular shape about a central axis, and comprising:
   a first radial zone defining a radially innermost portion of the housing structure;
   a second radial zone adjacent to and extending radially outward from the first radial zone; and
   a third radial zone adjacent to and extending radially outward of the second radial zone; and
a plurality of fuel injectors circumferentially arranged about the central axis and operatively associated with the housing structure, wherein the housing structure is configured to angle each of the plurality of fuel injectors in a direction disposed to effuse flow in a vector having a tangential flow component,
wherein the plurality of fuel injectors is distributed among the first, second, and third radial zones such that:
   all fuel injectors located within the first radial zone are evenly circumferentially distributed about the central axis in an inner circumferential row, and oriented to effuse flow in a first swirl direction relative to the housing structure;
   all fuel injectors located within the second radial zone are evenly circumferentially distributed about the central axis in a medial circumferential row surrounding the inner circumferential row, and oriented to effuse in an axial direction without any tangential component relative to the central axis; and
   all fuel injectors located within the third radial zone are evenly circumferentially distributed about the central axis in an outer circumferential row surrounding the medial circumferential row, and oriented to effuse flow in a second swirl direction relative to the housing structure, the second swirl direction opposite from the first swirl direction,
wherein the first radial zone, second radial zone, and third radial zone have an equal number of fuel injectors, and the fuel injectors of the second radial zone are equally circumferentially spaced between the fuel injectors of the first radial zone, and the fuel injectors of the third radial zone are equally circumferentially spaced between the fuel injectors of the second radial zone.

2. The fuel injector assembly of claim 1, wherein the one or more fuel injectors are disposed in the housing structure.

3. The fuel injector assembly of claim 1, wherein the one or more fuel injectors are integrally formed with the housing structure.

4. A combustor assembly for a turbomachine, comprising:
a fuel injector assembly, comprising:
   a housing structure defining a circular shape about a central axis; and
   one or more fuel injectors operatively associated with the housing structure, wherein the housing structure is configured to angle the one or more fuel injectors in a direction such that the one or more fuel injectors effuse flow in a vector having a tangential flow component,
   wherein the one or more fuel injectors include a plurality of circumferentially arranged fuel injectors, wherein the housing structure includes three or more adjacent concentric rings of the fuel injectors defined about the central axis, wherein the housing structure is shaped such that an outer ring of fuel injectors are arranged in a first radial zone, in which all fuel injectors are distributed equally circumferentially around the central axis, and are configured to effuse flow in a first swirl direction relative to the housing structure, wherein an inner ring of fuel injectors are arranged in a second radial zone, in which all fuel injectors are distributed equally circumferentially around the central axis, and are configured to effuse flow in a second swirl direction relative to the housing structure, the second swirl direction opposite from the first swirl direction, wherein a third ring of fuel injectors is a medial ring of fuel injectors radially between the outer ring and the inner ring of fuel injectors, wherein the housing structure is shaped such that the medial ring of fuel injectors does not include a tangential component, and the third ring of fuel injectors are arranged in a third radial zone, in which all fuel injectors are distributed equally circumferentially around the central axis, and effuse flow in an axial direction without a swirl direction,
   wherein the first radial zone, second radial zone, and third radial zone have an equal number of fuel injectors, and the fuel injectors of the third radial zone are equally circumferentially spaced between the fuel injectors of the first radial zone, and the fuel injectors of the second radial zone are equally circumferentially spaced between the fuel injectors of the third radial zone.

5. The combustor assembly of claim 4, wherein the one or more fuel injectors are disposed in the housing structure.

6. The combustor assembly of claim 4, wherein the one or more fuel injectors are integrally formed with the housing structure.

7. The combustor assembly of claim 6, wherein the one or more fuel injectors are additively manufactured integrally with the housing structure.

8. The combustor assembly of claim 4, wherein the central axis is a swirl axis for each of the inner ring and outer ring, wherein the swirl axis is combustor axis.

9. A method, comprising: effusing flow into a turbomachine combustor having a tangential flow component, wherein effusing flow includes creating a first swirl direction in a first ring about a central axis, creating an axial flow in a second ring adjacent the first ring, the axial flow parallel to the central axis; and creating a second swirl direction opposite with first swirl direction in a third ring about the central axis that is concentric with the first ring and the second ring and adjacent the second ring wherein there are an equal number of fuel injectors in the first ring, second ring, and third ring, and the fuel injectors of the first ring are equally circumferentially spaced between the fuel injectors of the second ring, and the fuel injectors of the second ring are equally circumferentially spaced between the fuel injectors of the third ring, wherein all the fuel injectors within the first ring effuse flow in the first swirl direction, all the fuel injectors within the second ring effuse flow in the axial direction, and all the fuel injectors of the third ring effuse flow in the second swirl direction.

* * * * *